(12) United States Patent
Jacobsen et al.

(10) Patent No.: US 9,200,625 B2
(45) Date of Patent: Dec. 1, 2015

(54) REGENERATIVE HYDRAULIC PUMP

(75) Inventors: Stephen C. Jacobsen, Salt Lake City, UT (US); John McCullough, Salt Lake City, UT (US); Marc X. Olivier, Salt Lake City, UT (US); Fraser M. Smith, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 1020 days.

(21) Appl. No.: 12/959,198

(22) Filed: Dec. 2, 2010

(65) Prior Publication Data

US 2012/0137667 A1 Jun. 7, 2012

(51) Int. Cl.
| F04B 11/00 | (2006.01) |
| F04B 17/05 | (2006.01) |
| B60K 6/12 | (2006.01) |
| F02B 63/06 | (2006.01) |
| F02B 67/08 | (2006.01) |
| F04B 1/04 | (2006.01) |
| F04B 1/053 | (2006.01) |
| F04B 9/04 | (2006.01) |
| F04B 49/16 | (2006.01) |
| F04B 53/16 | (2006.01) |

(52) U.S. Cl.
CPC . *F04B 17/05* (2013.01); *B60K 6/12* (2013.01); *F02B 63/06* (2013.01); *F02B 67/08* (2013.01); *F04B 1/0421* (2013.01); *F04B 1/053* (2013.01); *F04B 9/045* (2013.01); *F04B 11/0016* (2013.01); *F04B 11/0033* (2013.01); *F04B 49/16* (2013.01); *F04B 53/162* (2013.01); *Y02T 10/6208* (2013.01)

(58) Field of Classification Search
CPC .................. F04B 11/0016; F04B 11/0033
USPC ......... 60/416, 469; 92/60.5; 138/31; 417/275
See application file for complete search history.

(56) References Cited

U.S. PATENT DOCUMENTS

| 3,730,652 | A | 5/1973 | Roberts |
| 4,140,440 | A | 2/1979 | Ferris |
| 4,216,702 | A | 8/1980 | Brundidge et al. |
| 4,431,379 | A | 2/1984 | Langdon |
| 4,435,133 | A | 3/1984 | Meulendyk |
| 4,606,708 | A | 8/1986 | Clark |
| RE33,235 | E | 6/1990 | Corsette |
| 5,167,292 | A | 12/1992 | Moiroux et al. |
| 5,634,779 | A | 6/1997 | Eysymontt |
| 5,794,441 | A | 8/1998 | Lisniansky |
| 6,152,091 | A | 11/2000 | Bailey et al. |
| 6,378,301 | B2 | 4/2002 | Endo et al. |
| 6,863,507 | B1 | 3/2005 | Schaeffer et al. |
| 6,912,849 | B2 | 7/2005 | Inoue et al. |

FOREIGN PATENT DOCUMENTS

GB 228536 5/1926

*Primary Examiner* — F. Daniel Lopez

(57) ABSTRACT

A regenerative hydraulic pump that allows for efficient operation of a hydraulic system under high pressure/low flow conditions that comprises a crankshaft providing a rotating inertial mass, and a regenerative hydraulic pump cylinder that comprises a pump cylinder housing, a pump piston mechanically connected to the crankshaft; and a compliant pressure chamber that stores a portion of the energy extracted by the pump piston during a pumping stroke for release back to the pump piston and to the crankshaft during a regenerative back stroke.

17 Claims, 8 Drawing Sheets

REGENERATIVE HYDRAULIC PUMP

FIELD OF THE INVENTION

The present invention relates generally to internal combustion engines, and to hydraulic pumping systems that extract energy from an internal combustion or other type of engine or motor-driven rotating crankshaft, and that convert such energy into usable energy or work.

BACKGROUND OF THE INVENTION AND RELATED ART

There are many different types of primary power sources available that convert fossil and other fuels into usable energy or power designed to perform work for one or more purposes. Some of the applications utilizing such power sources include everyday common items, such as motor vehicles, lawn mowers, generators, hydraulic systems, etc. Perhaps the best known example of a primary power source is the well known internal combustion engine, which converts the energy obtained or generated from the combustion of fossil fuel into usable energy, such as mechanical energy, electrical energy, hydraulic energy, etc. Indeed, an internal combustion engine has many uses both as a motor and as a power source used to drive or actuate various items, such as a pump. Converting fossil fuels into usable energy is also accomplished in large electricity plants, which supply electric power to power grids accessed by thousands of individual users.

While primary power sources have been successfully used to perform the several functions described above, they have not been successfully used independently in many applications because of their relatively slow response characteristics. Although large amounts of energy are contained within a single drop of fuel, internal combustion engines are particularly problematic in powering small devices, and particularly robotic devices and other similar systems that utilize a feedback loop to make real time adjustments in the movement of the mechanical structure being driven. In a robotic or any other system requiring rapid response, the power source typically must be able to generate output power that is capable of instantaneous or near instantaneous correction, as determined by the feedback received, that is necessary to maintain proper operation of the robotic device. Primary power sources utilizing fossil fuels for energy production have proved difficult or largely unworkable in these environments.

The response speed or response time of a power source functioning within a mechanical system, which response time is more accurately referred to as the system's bandwidth, is an indication of how quickly the energy produced by the power source can be converted, accessed, and utilized by an application. One example of a rapid response power system is a hydraulic power system. In a hydraulic system, energy from any number of sources can be used to pressurize hydraulic fluid, which pressurized fluid is stored in an accumulator for later use. This is what is meant by charging the accumulator. The energy contained in the stored pressurized fluid can be accessed almost instantaneously by opening a valve in the system and releasing the fluid in the accumulator for the purpose of performing work, such as extending or retracting a hydraulically driven actuator. The response time of this type of hydraulic system is very rapid, on the order of a few milliseconds or less.

An example of a relatively slow response power conversion system is the internal combustion engine, as discussed above. The accelerator on a vehicle equipped with an internal combustion engine controls the rotational speed of the engine, measured in rotations or revolutions per minute ("rpm"). When power is desired, the accelerator is activated and the engine increases its rotational speed accordingly. Setting aside impedance factors, the engine cannot reach the desired change in a very rapid fashion due to several inertial forces internal to the engine and the nature of the combustion process. If the maximum rotational output of an engine is 7000 rpm, then the time it takes for the engine to go from 0 to 7000 rpm is a measure of the response time of the engine, which can be a few seconds or more. Moreover, if it is attempted to operate the engine repeatedly in a rapid cycle from 0 to 7000 rpm and back to 0 rpm, the response time of the engine slows even further as the engine attempts to respond to the cyclic signal. In contrast, a hydraulic cylinder can be actuated in a matter of milliseconds or less, and can be operated in a rapid cycle without compromising its fast response time.

Once method of circumventing the slow response time of an internal combustion engine is to run the engine continuously at high speed, even when the pressurized fluid is not needed, and recycling the high-pressure fluid back into the intake reservoir through a throttle valve. In this configuration, a conventional piston pump continues to extract power with each pumping stroke as it forces the fluid into the high-pressure discharge line. If this high-pressure fluid is not needed by the system at that precise moment, it is directed to a bypass line which recycles the fluid back to the low pressure intake reservoir through a throttle valve, pressure orifice or other similar device that bleeds off the high pressure. Unfortunately, these pressure bleed-off devices cannot recover any of the work used to pressurize the fluid in the first place, so the energy is effectively lost. Operating in a high speed idle mode, therefore, is very disadvantageous for a conventional pumping system. It results in a great waste of power and energy whenever the pumped, high pressure fluid cannot be accommodated by the high-pressure side of the system.

To get around these inherent limitations with internal combustion engines, many applications require the energy produced by the primary power source to be stored in another, more rapidly responsive energy system capable of holding the energy in reserve so that the energy can be accessed later instantaneously. One example of such an application is heavy earth moving equipment, such as backhoes and front end loaders, which utilize the hydraulic pressure system discussed above. Heavy equipment is generally powered by an internal combustion engine, usually a diesel engine, which supplies ample power for the maneuvering and driving of the equipment, but is incapable of meeting the energy response requirements of the various functional components, such as the bucket or backhoe. By storing and amplifying the power from the internal combustion engine in the hydraulic system, the heavy equipment is capable of producing, in a rapid response, great force with very accurate control. However, this versatility comes at a cost. In order for a system to be energetically autonomous and be capable of rapid, precise control, more component parts or structures are required, thus increasing the size, weight and complexity of the system, as well as its attendant operating costs.

Another example of a rapid response power supply is an electrical supply grid or electric storage device such as a battery. The power available in the power supply grid or battery can be accessed as quickly as a switch can be opened or closed. A myriad of motors and other applications have been developed to utilize such electric power sources. Stationary applications that can be connected to the power grid can utilize direct electrical input from the generating source. However, in order to use electric power in a system without tethering the system to the power grid, the system must be configured to use energy storage devices such as batteries, which can be very large and heavy. As modern technology moves into miniaturization of devices, the extra weight and volume of the power source and its attendant conversion hardware are becoming major hurdles against meaningful progress.

The complications inherent in using a primary power source to power a rapid response source become increasing problematic in applications such as robotics. In order for a robot to accurately mimic human movements, the robot must be capable of making precise, controlled, and timely movements. This level of control requires a rapid response system such as the hydraulic or electric systems discussed above. Because these rapid response systems require power from some primary power source, the robot must either be part of a larger system that supplies power to the rapid response system or the robot must be directly equipped with one or more heavy primary power sources or electric storage devices. Ideally, however, robots and other applications should have minimal weight, and should be energetically autonomous, not tethered to a power source with hydraulic or electric supply lines. To date, however, technology has struggled to realize this combination of rapid response, minimal weight, effective control, and autonomy of operation.

SUMMARY OF THE INVENTION

In light of the problems and deficiencies inherent in the prior art, the present invention seeks to overcome these by providing a regenerative hydraulic pumping system which allows the internal combustion engine to run continuously and efficiently at high speed in between periods of pumping demand, so that the power and torque of the engine is instantaneously available when needed. By running the engine continuously at high speed regardless of the operating state of the hydraulic actuator, the response time of the system is near-instantaneous because it is able to respond with the next pumping stroke. This eliminates the 'ramping-up' response time period, identified hereinabove as the time period between the moment when the additional hydraulic pressure is demanded to the moment when the internal combustion engine/hydraulic pump system reaches an operating speed capable of meeting that demand, which in conventional systems may be several seconds or more.

The regenerative hydraulic pump of the present invention circumvents the problems associated with running continuously at high speed with a regenerative pump cylinder that can momentarily store a portion of the energy extracted from a rotating crankshaft during a pumping stroke, for immediate release back to the crankshaft during a regenerative back stroke. This novel capability is accomplished by way of a compliant pressure chamber, which acts as a spring to store unused pumping energy as compressed potential spring energy. Instead of forcing more fluid into an already saturated high-pressure system, with regenerative pumping the energy extracted during the pumping stroke is generally conserved and immediately fed back into the power system via the back stroke, allowing the engine to run at high speed during periods of non-use with only the energy needed to overcome incidental losses. Consequently, the continuous operation at high speed enables the hydraulic pump to respond in near-instantaneous fashion to increased demand by the downstream hydraulic system, and when the hydraulic fluid is not needed the engine can continue running at the same speed without wasting energy.

Furthermore, the spring constant of the compliant pressure chamber can be configured for both a linear response and a non-linear response, with a preference for a non-linear spring constant as it allows for improved performance under a wider range of operating conditions. For example, in a low pressure/high flow operating state, a softer, more compliant spring constant allows for highly efficient operation. But this same soft, compliant spring constant cannot generate the necessary resistance to produce the required pressure in high pressure/low flow operating states. Therefore, a harder, stiffer spring constant is needed during these conditions. As performance has generally won out over efficiency, the pressure chambers in conventional hydraulic pumps are rigid cylinders with infinitely stiff spring constants. The compliant pressure chamber of the present invention, however, allows for pump response characteristics that are very stiff when operating in high pressure states, but more compliant when the discharge pressure requirement is reduced.

Therefore, it is an object of some of the exemplary embodiments of the present invention to operate an internal combustion engine to generate energy for a hydraulic pump.

It is another object of some of the exemplary embodiments of the present invention to modify the operation of an internal combustion engine/hydraulic pump system to store a portion of the energy extracted during a pump stroke as potential spring energy in a compliant pressure chamber.

It is still another object of some of the exemplary embodiments of the present invention to optimize the operation of an internal combustion engine/regenerative hydraulic pump system to transfer the potential spring energy stored in a compliant pressure chamber back into the internal combustion engine during a regenerative back stroke.

Although several objects of some of the various exemplary embodiments have been specifically recited herein, these should not be construed as limiting the scope of the present invention in any way. Indeed, it is contemplated that each of the various exemplary embodiments comprises other objects that are not specifically recited herein. These other objects will be apparent to and appreciated by one of ordinary skill in the art upon practicing the invention as taught and described herein. For instance, although an internal combustion engine is cited most often as the driver of the regenerative hydraulic pump, it is to be understood that the regenerative hydraulic pump works equally well with motors, as well as other types of drivers.

To achieve the foregoing objects, and in accordance with the invention as embodied and broadly described herein, the present invention features a regenerative hydraulic pump comprising: (a) a regenerative pump cylinder connected to a crankshaft and a drive system, wherein the crankshaft provides a rotating inertial mass to transfer energy between the drive system and the pump cylinder; (b) a pump piston mechanically connected to the crankshaft; (c) a pump housing that surrounds the pump piston and is fluidly connected to a low-pressure inlet line and high-pressure discharge line; and (d) a compliant pressure chamber located within the pump housing having a compliant member, such as a spring piston, gas bladder or other similar device, which compresses according to a mechanical spring constant. It is this compliant member that stores a portion of the energy extracted from the rotating crankshaft by the pump piston during a pump stroke, and which can immediately release the stored energy back to the pump piston and crankshaft during a regenerative back stroke.

The portion of pumping energy stored by the compliant pressure chamber varies according to the relationship between the pressure of the high-pressure discharge line; the stiffness of the compliant member's spring constant, and the value of a preload imposed on the compliant member. This preload may be the force generated by a pre-compressed spring supporting a spring piston, a charge of gas in a gas bladder, or any similar means of preloading a compliant member. The preload imposed on the compliant member is converted to an effective preload pressure in proportion to the exposed surface area of the compliant member in the pressure chamber. As the amount of exposed surface area depends greatly on the design of the compliant pressure chamber, the designer has great flexibility in adjusting spring constants and surface areas to achieve a desired effective preload pressure.

The degree of preload affects the regenerative hydraulic pump as follows: if the discharge pressure is below the effective pressure created by the preload, the valve to the high-pressure discharge line will open to the rising internal pressure before the effective preload pressure is reached, and all the energy extracted by the pump piston will be converted into work that pumps a volume of fluid under pressure into the high-pressure discharge line. Under these circumstances, the compliant pressure chamber does not temporarily store any extracted energy and the regenerative pump acts as a conventional pump.

When the discharge pressure is above the effective preload pressure, however, the pressure inside the pump housing will rise during the pumping stroke until the effective preload pressure is reached, at which point the compliant member will begin to move or compress. The compliant member continues to compress against its spring constant, storing potential spring energy, until the internal pressure reaches the level of the discharge pressure. At this point the valve to the discharge line opens and fluid flows out of the pressure chamber for the remainder of the pumping stroke. Once the pump piston's forward pumping stroke is completed and the piston begins to move back, at that instant the compliant member will begin to return back to its original configuration, releasing its stored spring energy back to the pump piston, and ultimately to the crankshaft, by maintaining an artificially high back pressure on the pump piston until the compliant member again reaches its starting position.

If the discharge pressure is so high that the internal pressure does not reach the discharge pressure before the end of the pump stroke, the compliant member will store all of the energy extracted by the pump piston as potential spring energy, all of which will be released back to the pump piston, and to the crankshaft, during the subsequent back stroke. Operating in this state of very high pressure/zero flow, there are still minor losses due to friction, leakage and hysteresis effects. However, a large portion of the energy is recycled back to the rotating inertia mass of the crankshaft, and is made available for the next pumping cycle. Thus, the regenerative hydraulic pump can continue to efficiently operate at high speeds until such time as the discharge pressure drops to a level that more hydraulic fluid is needed to operate the hydraulic system.

The present invention further features a hydraulic pump system for efficient operation under high pressure/low flow conditions comprising: (a) a crankshaft that provides a rotating inertial mass; (b) an internal combustion engine having a power cylinder housing and a power piston mechanically connected to the crankshaft; (c) a regenerative hydraulic pump having a pump cylinder housing and a pump piston mechanically connected to the same crankshaft; and (d) a compliant pressure chamber having a compliant member which compresses according to a spring constant to store a portion of the energy extracted from the rotating crankshaft during a pump stroke for immediately release back to the crankshaft during a regenerative back stroke.

The present invention still further features a method for operating a regenerative hydraulic pump under high pressure/low flow conditions, wherein the method comprises: (a) connecting a crankshaft that is mechanically connected to a drive system to a regenerative hydraulic pump cylinder that contains a pump piston and compliant pressure chamber having a spring constant; (b) connecting the compliant pressure chamber to a source of low-pressure hydraulic fluid through a suction valve; (c) connecting the compliant pressure chamber to a pressurized receiver of high-pressure hydraulic fluid through a discharge valve; (d) causing the pump piston to draw a volume of low-pressure hydraulic fluid into the compliant pressure chamber through the suction valve; (e) causing the pump piston to pressurize the hydraulic fluid against the spring constant of the compliant pressure chamber, thereby storing a portion of the energy of the pumping stroke as potential energy within the compliant pressure chamber, until the hydraulic fluid reaches a threshold pressure sufficient to cause the hydraulic fluid to flow into the pressurized receiver through the discharge valve; and (f) causing the compliant pressure chamber to release the stored potential energy back to the pump piston and to the drive system connected to the crankshaft during a regenerative backstroke.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
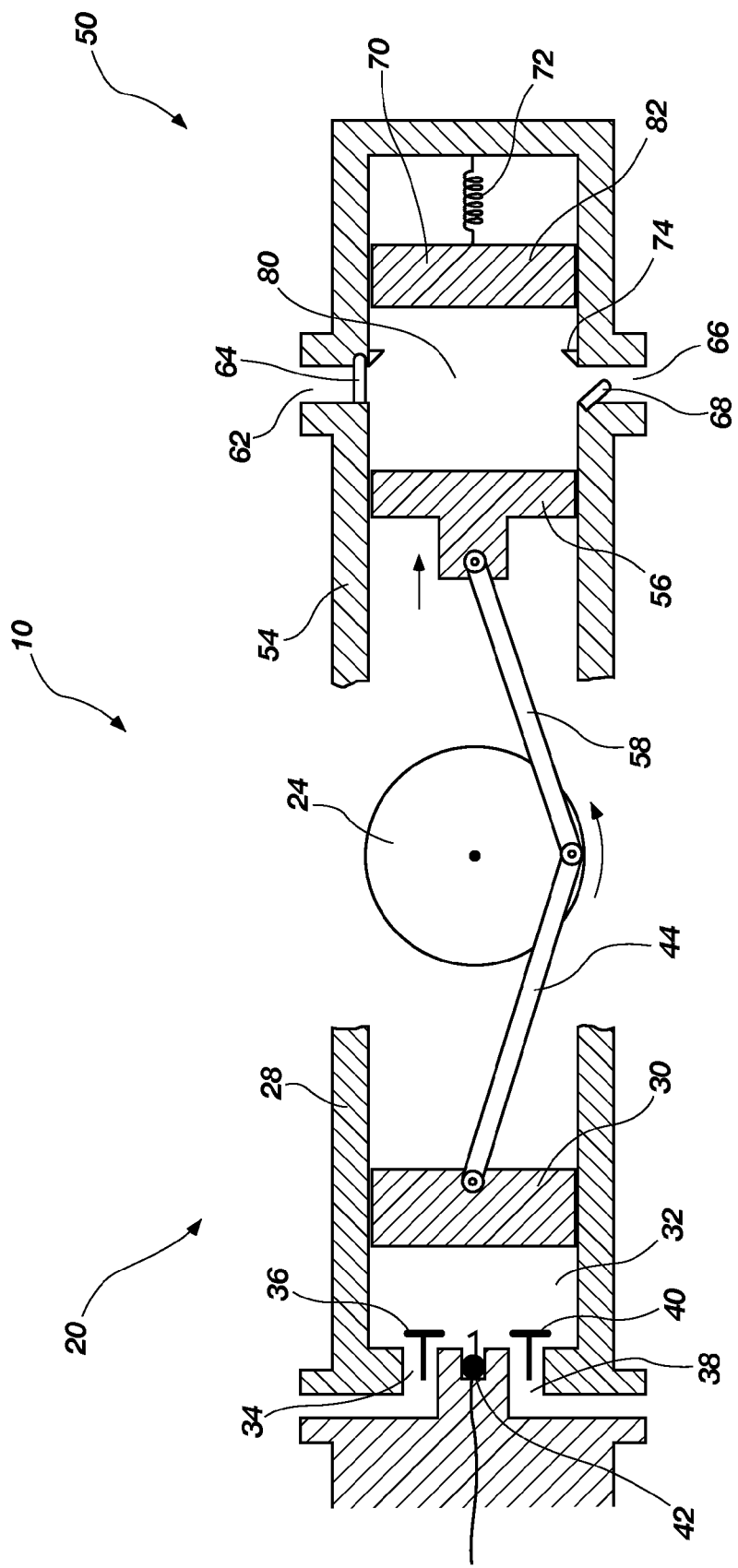
FIG. 1 illustrates a schematic side view of a regenerative hydraulic pump system powered by an internal combustion engine, according to one exemplary embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 9, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Generally, the present invention describes a method and system for a regenerative hydraulic pump system which allows for efficient high speed operation during high pressure/low flow conditions by momentarily storing a portion of the energy extracted during the pumping stroke for release back to the crankshaft during a regenerative back stroke. In one exemplary embodiment shown in FIG. 1, the regenerative hydraulic pump system 10 comprises an internal combustion ("IC") engine 20, a crankshaft 24, and a regenerative hydraulic pump 50. In its most general form, the IC engine is further comprised of a power cylinder housing 28 and a power piston 30 which together enclose a combustion chamber 32. Fuel and air are introduced into the combustion chamber through an inlet port 34 via inlet valve 36, which opens at an appropriate moment in the power cycle. The inlet port/inlet valve configuration may be similar to the traditional engine design as depicted, or it may be altered to included fuel injectors or other more modern engine components familiar to one having skill in the art. Moreover, the engine may be configured to run either as a 2-cycle engine or a 4-cycle engine.

At the appropriate point in the power cycle, the air/fuel mixture inside the combustion chamber is ignited by an ignition source 42 to create a controlled combustion which drives the power piston towards open end of the power cylinder. The power piston is connected to the crankshaft with a power rod 44, which transfers the energy of combustion from the linear movement of the power piston to rotating movement of the crankshaft. The crankshaft provides a rotating inertial mass which absorbs and smooths the energy impulses generated by the IC engine. During the power piston's return stroke, the exhaust valve 40 opens and the exhaust gases in the combustion chamber are pushed out through the exhaust port 38.

The crankshaft is in turn connected to the regenerative hydraulic pump cylinder through the pump rod 58, which connects on the other end to the pump piston 56. The pump piston translates back and forth within the pump cylinder housing 54. The pump cylinder housing is connected to a low-pressure reservoir of hydraulic fluid (not shown) through at least one suction port 62 having a suction valve 64. The pump cylinder housing is also connected to a pressurized receiver of high pressure fluid (not shown) through at least one discharge port 66 having a discharge valve 68.

Both the suction valve and discharge valve may be configured with spring-loaded valves that are biased in the closed position, but which open when the pressure differential across the valve is large enough to overcome the preload. For example, the suction valve will automatically open when the pressure inside the pressure chamber drops below the pressure of the low-pressure reservoir (not shown) during a suction stroke, filling the pressure chamber with hydraulic fluid. And during a pumping stroke the discharge valve will open as soon as the pressure inside the chamber exceeds the pressure on the high-pressure side of the discharge valve, allowing the pressurized fluid to flow into the discharge line.

In the exemplary embodiment shown in FIG. 1, a spring piston 70, is attached to the far end of the pump cylinder housing with a spring 72. The spring is preloaded in a compressed state such that the spring piston is normally pressed firmly against piston stops 74. The spring piston 70, more generally known as a compliant member 82, forms one surface of compliant pressure chamber 80, which is otherwise bounded by the pump piston and interior surfaces of the pump cylinder housing.

Figure 2A:
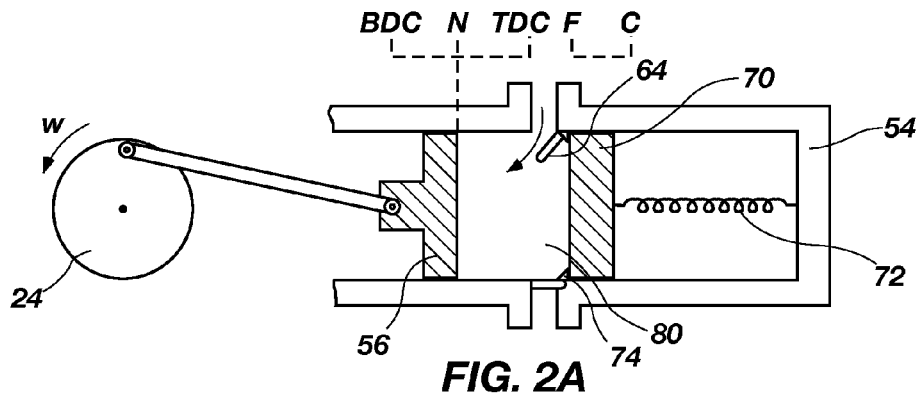
FIGS. 2A-2D illustrate various schematic side views of the operation of a regenerative hydraulic pump cylinder, according to the exemplary embodiment shown in FIG. 1.
Figure 2B:
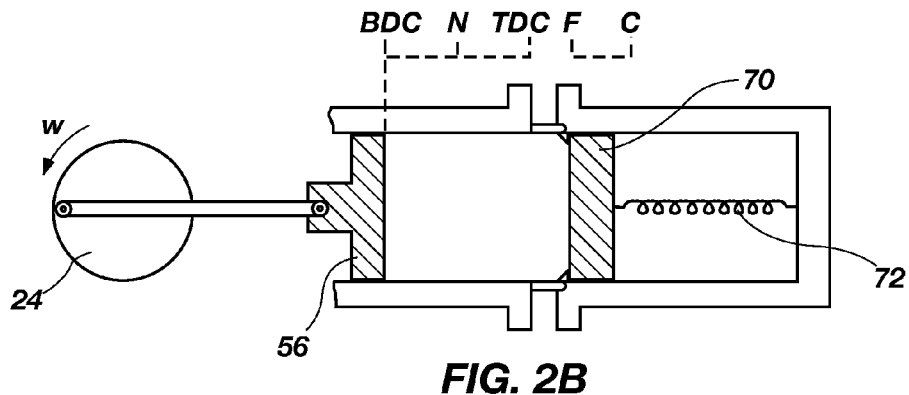

FIGS. 2A-2D illustrate operation of the spring piston 70 as it moves back and forth within the pump cylinder housing 54 in response to the pressure variations which take place inside compliant pressure chamber 80 during a pumping cycle. The pump piston 56 is in a neutral position ("N") corresponding to the commencement of a suction stoke, which occurs as the pump piston moves from position N (FIG. 2A) to Bottom Dead Center ("BDC") (FIG. 2B). During the suction stroke, suction valve 64 opens to allow a charge of hydraulic fluid to flow into the compliant pressure chamber.

After the piston reaches BDC and begins to move forward in response to the rotation of crankshaft 24, as shown in FIG. 2B, the suction valve closes and the compliant pressure chamber begins to pressurize. Up until this point in the pump cycle, spring piston 70 has been held in a forward position ("F") against piston stops 74 by spring 72, which is preloaded to generate a force that counters the pressure building up inside the compliant pressure chamber. Taking into account the surface area of the front face the spring piston, this preload force generates an effective preload pressure which must be overcome by the fluid in the compliant pressure chamber before the spring piston will move away from the piston stops.

Figure 2C:
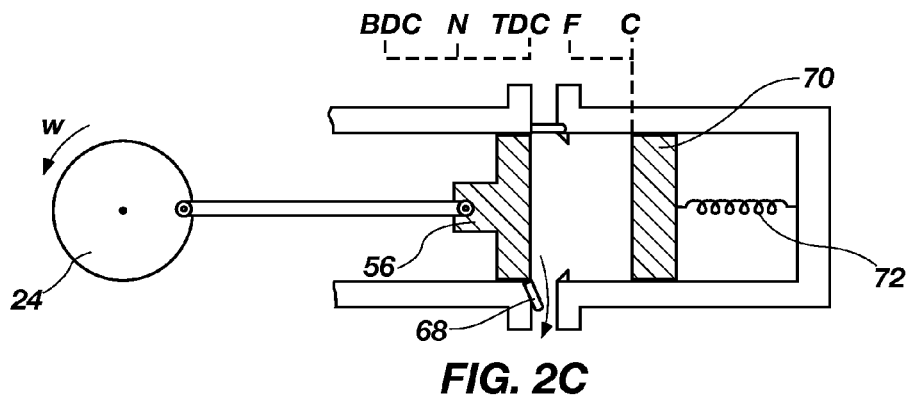

If the discharge pressure on the backside of discharge valve 68 is above the effective preload pressure, when the pump piston begins to move from BDC to Top Dead Center ("TDC") the pressure inside the compliant pressure chamber will immediately rise until the effective preload pressure is reached, at which point the spring will start to compress and the spring piston will begin to move to compressed position ("C"), as illustrated in FIG. 2C. As the pump stroke proceeds further the pressure will continue to rise at a lower rate while the spring compresses, which simultaneously stores potential spring energy and provides ever greater resistance against the pumping pressure imparted by the pump piston. Eventually the pressure inside the compliant pressure chamber reaches the level of the discharge pressure and the discharge valve opens, allowing high pressure hydraulic fluid to flow out of the pressure chamber for the remainder of the pump stroke.

Figure 2D:
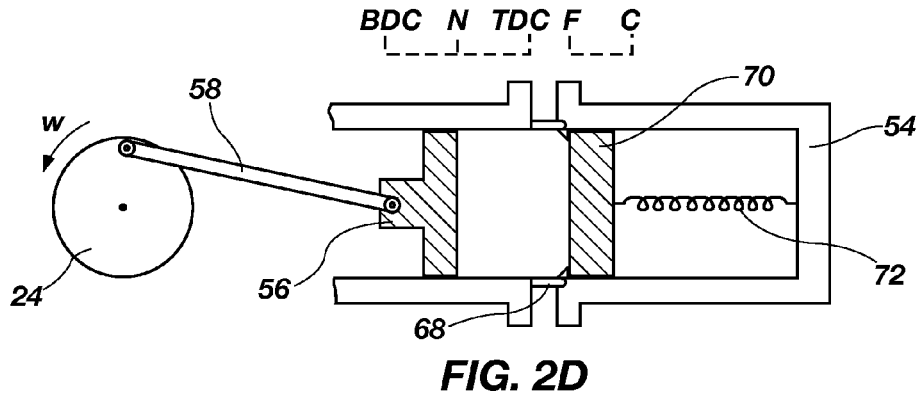

As shown in FIG. 2D, upon reaching TDC, the discharge valve closes and the pump piston begins its back stroke as it returns to position N. During this section of the pumping cycle, the spring piston maintains an artificially high back pressure on the remainder of the hydraulic fluid inside the compliant pressure chamber while the spring decompresses and pushes the spring piston back from position C to position F, following the movement of the pump piston. This back pressure is translated into a regenerative force imposed on the crankshaft by pump rod 58, in effect recycling a portion of the extracted pumping energy back to the crankshaft and engine drive system.

Depending on the relationship between the discharge pressure and the effective preload pressure, the portion of recycled energy may be large or small. If the discharge pressure is below the effective pressure created by the preload, the discharge valve will open to the rising internal pressure before the effective preload pressure is reached, and all the energy extracted by the pump piston will be converted into work that pumps a fixed volume of fluid under pressure into the high-pressure discharge line. Under these circumstances, the compliant pressure chamber does not temporarily store any extracted energy and the regenerative pump acts as a conventional pump.

At the other extreme, if the discharge pressure is so very high that the internal pressure does not reach the discharge pressure before the end of the pump stroke, the spring will store all of the energy extracted by the pump piston as potential spring energy, no fluid will flow passed the discharge valve, and nearly all the energy will be released back to the pump piston, and to the crankshaft, during the subsequent back stroke. Operating in this state of very high pressure/zero flow there are still minor losses due to friction, leakage and hysteresis effects. However, a large portion of the energy is recycled back to the rotating inertia mass of the crankshaft, and is made available for the next pumping cycle. Thus, the regenerative hydraulic pump can continue to efficiently operate at high speeds until such time as the discharge pressure drops to a level that more hydraulic fluid is needed to operate the hydraulic system.

Figure 3:
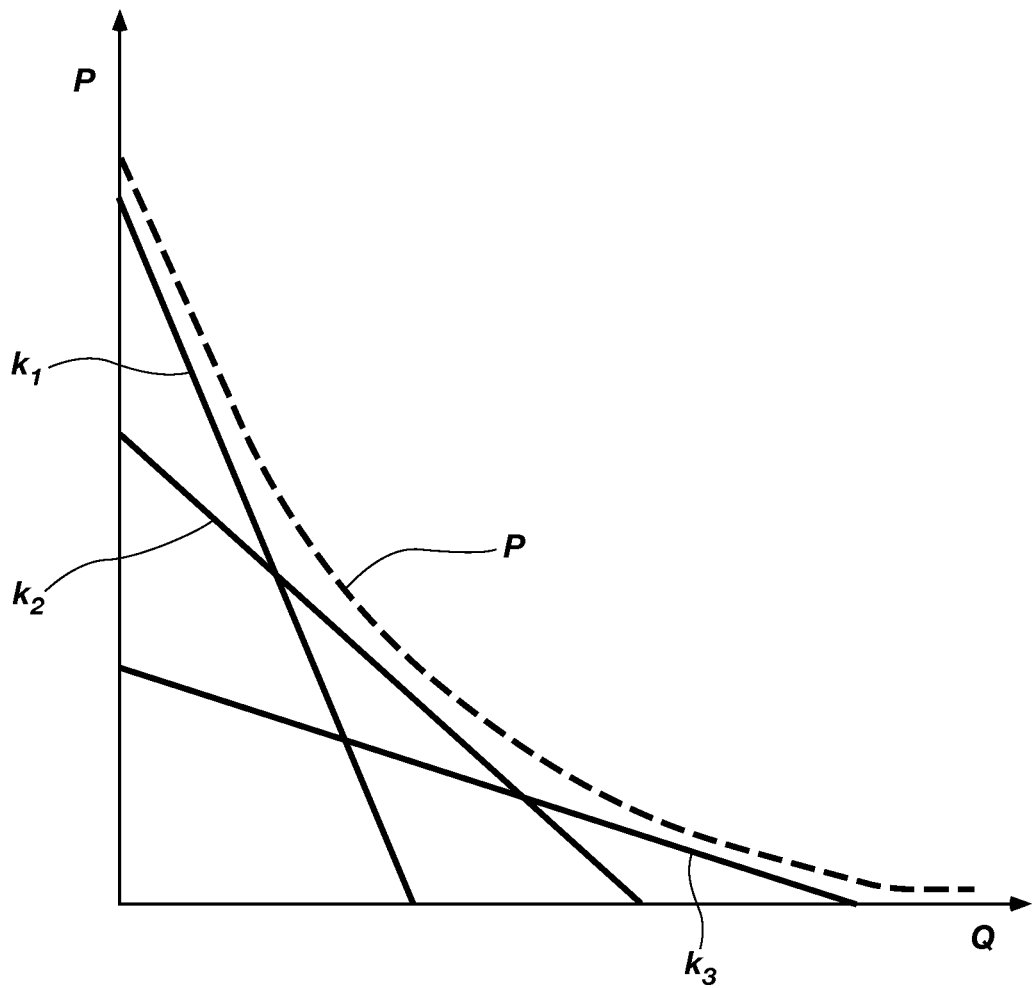
FIG. 3 illustrates the Pressure-Flow curve of a regenerative hydraulic pump according to the exemplary embodiment shown in FIG. 1.

The spring constant of the spring can be configured for both a linear response and a non-linear response, with a preference for a non-linear spring constant as it allows for improved performance under a wider range of operating conditions. For example, as shown in FIG. 3, in a low pressure/high flow operating state, a softer, more compliant spring constant $k_3$ allows for highly efficient operation. But this same soft, compliant spring cannot generate the necessary resistance to produce the required pressure in high pressure/low flow operating states before the spring piston would bottom out. Therefore, a harder, stiffer spring constant, such as $k_2$ or $k_1$, is needed during these conditions. As high-pressure performance in hydraulic systems has generally won out over efficiency, the pressure chambers in conventional hydraulic pumps are rigid cylinders with infinitely stiff spring constants. In using a compliant member with a non-linear spring constant, however, the present invention allows for pump response characteristics, or pump curves P, that are very stiff when operating in high pressure states, but more compliant when the discharge pressure requirement is reduced.

Figure 4:
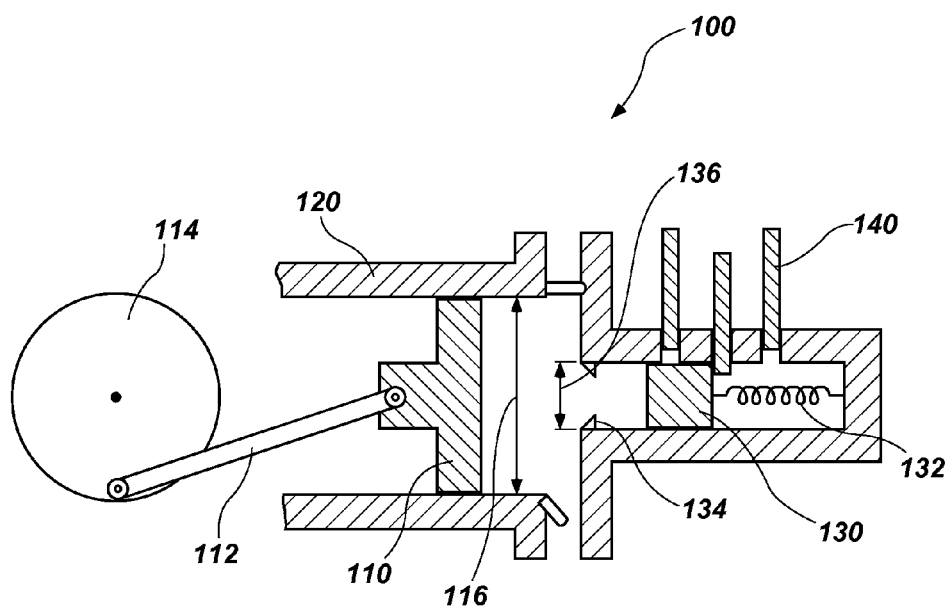
FIG. 4 illustrates a schematic side view of a regenerative hydraulic pump according to still another exemplary embodiment of the present invention.

FIG. 4. is an illustrative side view of another exemplary embodiment of the regenerative hydraulic pump 100 of the present invention. Also driven by a crankshaft 114 through a pump rod 112, the pump piston 110 slides within pump cylinder housing 120. This embodiment also employs a spring piston 130 which is preloaded to abut a piston stop 134 by spring 132, but one with a much smaller diameter 136 than the pump piston diameter 116. The difference in diameter between the pump piston and the spring piston illustrates the variation in configurations that can be employed to optimize the effective preload pressure of the spring piston in relation to the normal operating conditions of the hydraulic system. It should be understood by one having skill in the art that the size of the spring piston may be either larger or smaller than the pump piston, or indeed have a different shape or altogether different type of spring element, and still fall within the scope of the present invention. As long as the compliant member has a surface which forms part of the compliant pressure chamber of the regenerative hydraulic cylinder, it should be understood by one having skill in the art that the embodiment falls within the scope of the present invention.

Also shown in FIG. 4 are a series of locking pins 140 that can be used to limit the travel of the compliant member and thereby stiffen the response characteristics of the compliant pressure chamber beyond a certain pressure level. A single locking pin can be used, or multiple pins can be remotely controlled to provide variations in pumping performance and regenerative response.

Figure 5:
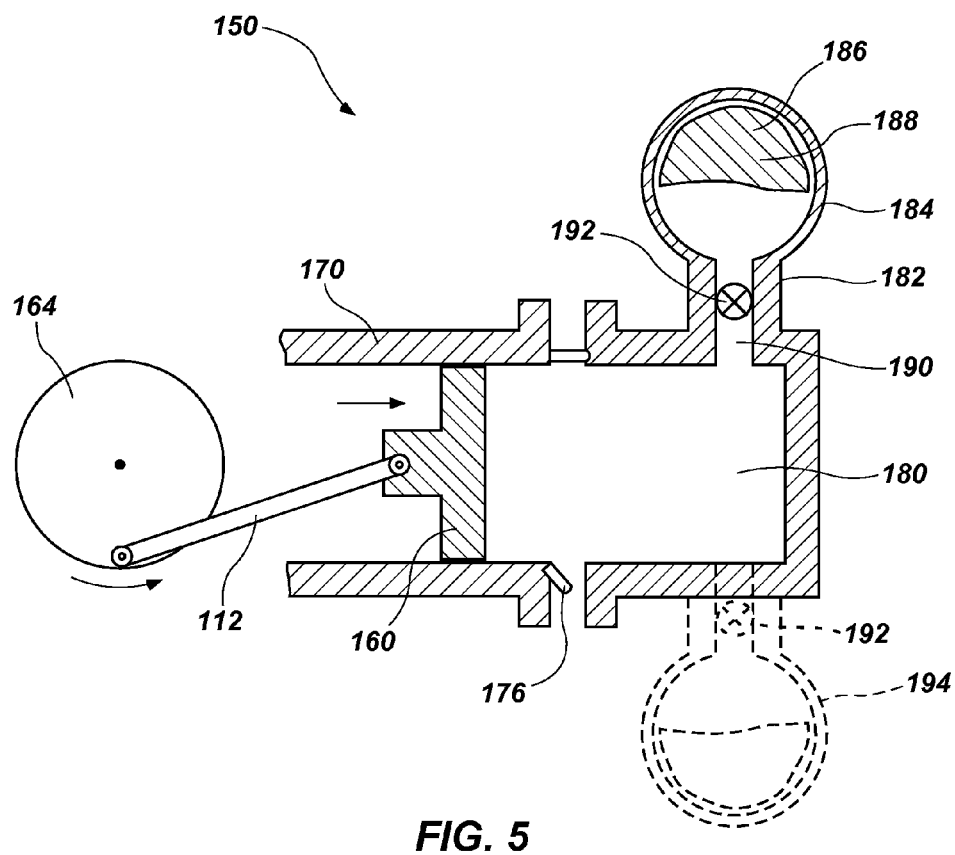
FIG. 5 illustrates a schematic side view of a regenerative hydraulic pump according to yet another exemplary embodiment of the present invention.

FIG. 5 illustrates yet another embodiment of the regenerative hydraulic pump 150 of the present invention in which the compliant member is a pneumatic accumulator 184 that extends beyond the side of the pump cylinder housing 170. The pneumatic accumulator is in fluid connection with the inside portion of the pump cylinder housing 180 through a hydraulic fluid channel 190 passing through an accumulator stem 182. The pneumatic accumulator is filled with the pumped hydraulic fluid except for a bladder 186 which is filled with a charge of compressed gas 188. The pneumatic accumulator works in the same fashion as the spring piston in the previously described embodiment, except that compression medium is different: the spring piston uses a mechanical spring, while the pneumatic accumulator employs compressible gas.

During a pumping stroke, crankshaft 164 turns to drive pump piston 160 towards the closed end of the pump cylinder, pressurizing the hydraulic fluid in the compliant pressure chamber. The charge of gas in the bladder immediately begins to compress, allowing the pressure inside the pressure chamber to rise along a pressure curve until reaching the discharge pressure, at which point the discharge valve 176 opens to allow the hydraulic fluid to flow into the high pressure portion of the hydraulic system for the remainder of the pumping stroke. During the back stroke the charge of compressed gas in the bladder expands to its original position, releasing its stored energy back to the pump piston and ultimately recycling the unused pumping energy back to the crankshaft.

Figure 6:
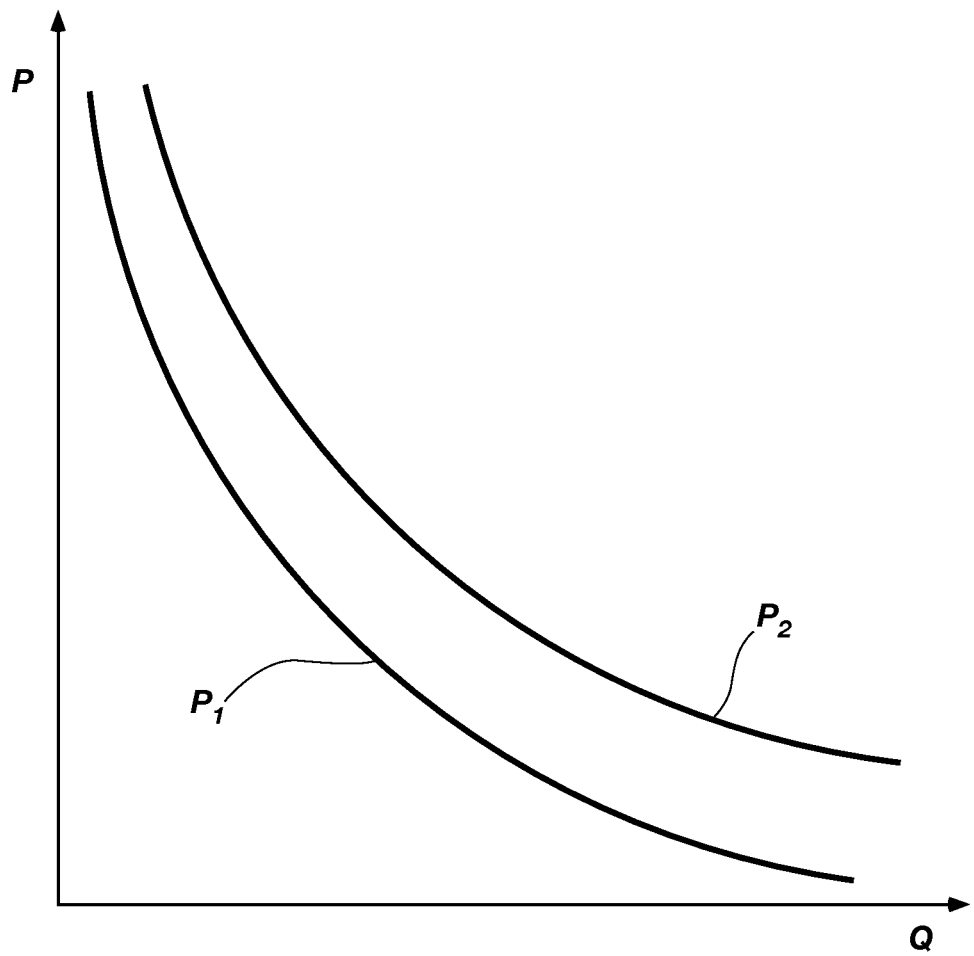
FIG. 6 illustrates the Pressure-Flow curve of a regenerative hydraulic pump according to the exemplary embodiment shown in FIG. 5.

One benefit of using a pneumatic accumulator is that its spring constant is inherently non-linear, as the stiffness of the compressed air in the gas bladder increases rapidly with the reduction in the surface area of the bladder resulting from the initial compression. Another benefit is that a second pneumatic accumulator 194 can easily be added to the same regenerative hydraulic cylinder, but this second bladder can have a diameter or gas charge different from the first. Finally, an accumulator valve 192 can be located in the hydraulic fluid channel that can quickly isolate either accumulator from the inside portion of the pump cylinder housing. Thus, as shown in FIG. 6, the original pump curve P1 can be quickly adjusted and moved to curve P2 as required to optimally meet the demands of the hydraulic system. The movement of the pump curve from P1 to P2 can also be accomplished by adjusting the physical volume of the pneumatic accumulator or the pressure of the gas charge inside the bladder.

Figure 7:
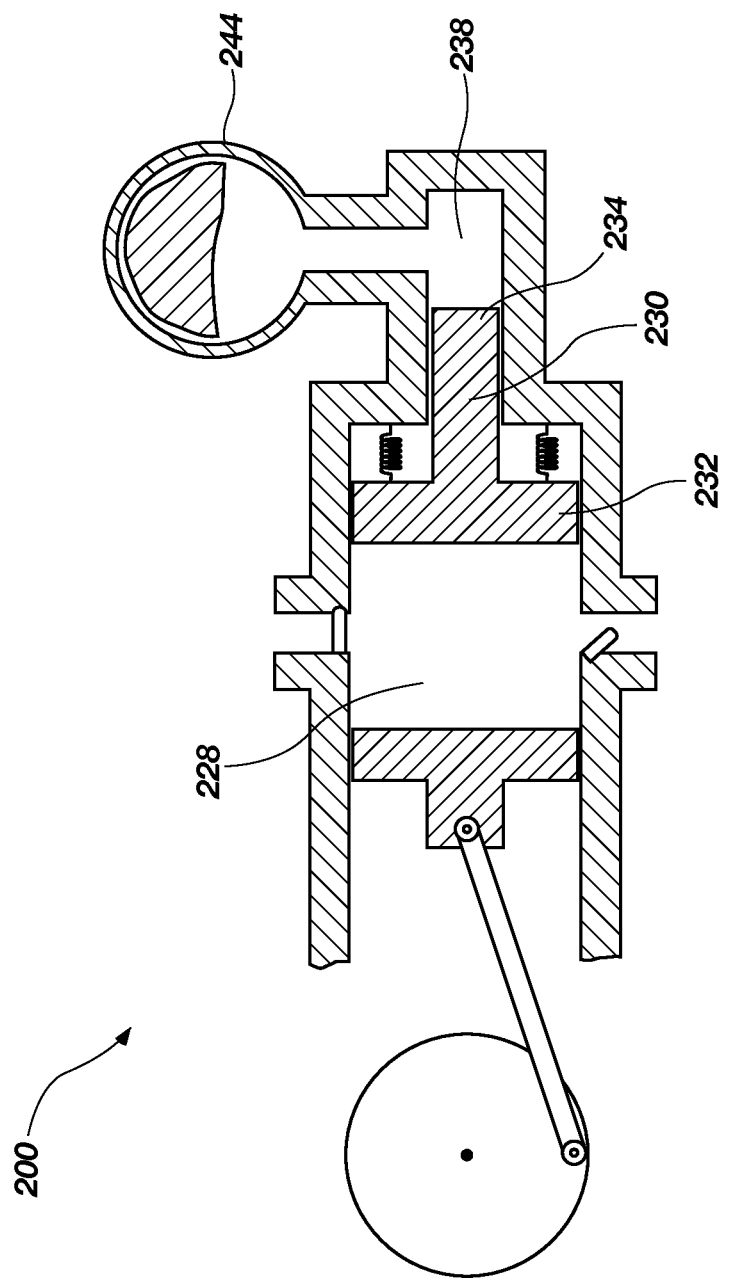
FIG. 7 illustrates a schematic side view of a regenerative hydraulic pump according to still another exemplary embodiment of the present invention.

Yet another embodiment of the regenerative hydraulic cylinder 200 is shown in FIG. 7, which is a hybrid combination of both types of compliant members, the spring piston 230 and the pneumatic accumulator 244. In the embodiment shown, the spring piston has a large diameter section 232 which is in fluid communication with the compliant pressure chamber 228, and a small diameter section 234 which is in fluid communication with the pneumatic accumulator. Although not required, this configuration allows the pneumatic accumulator to use a different liquid 238 than the hydraulic fluid being pumped by the hydraulic cylinder. FIG. 7 is also illustrative of the wide variety of options available to one having skill in the art in designing a regenerative hydraulic cylinder to meet the requirements of a specific hydraulic system, all of which may be considered to fall within the scope of the present invention.

Figure 8:
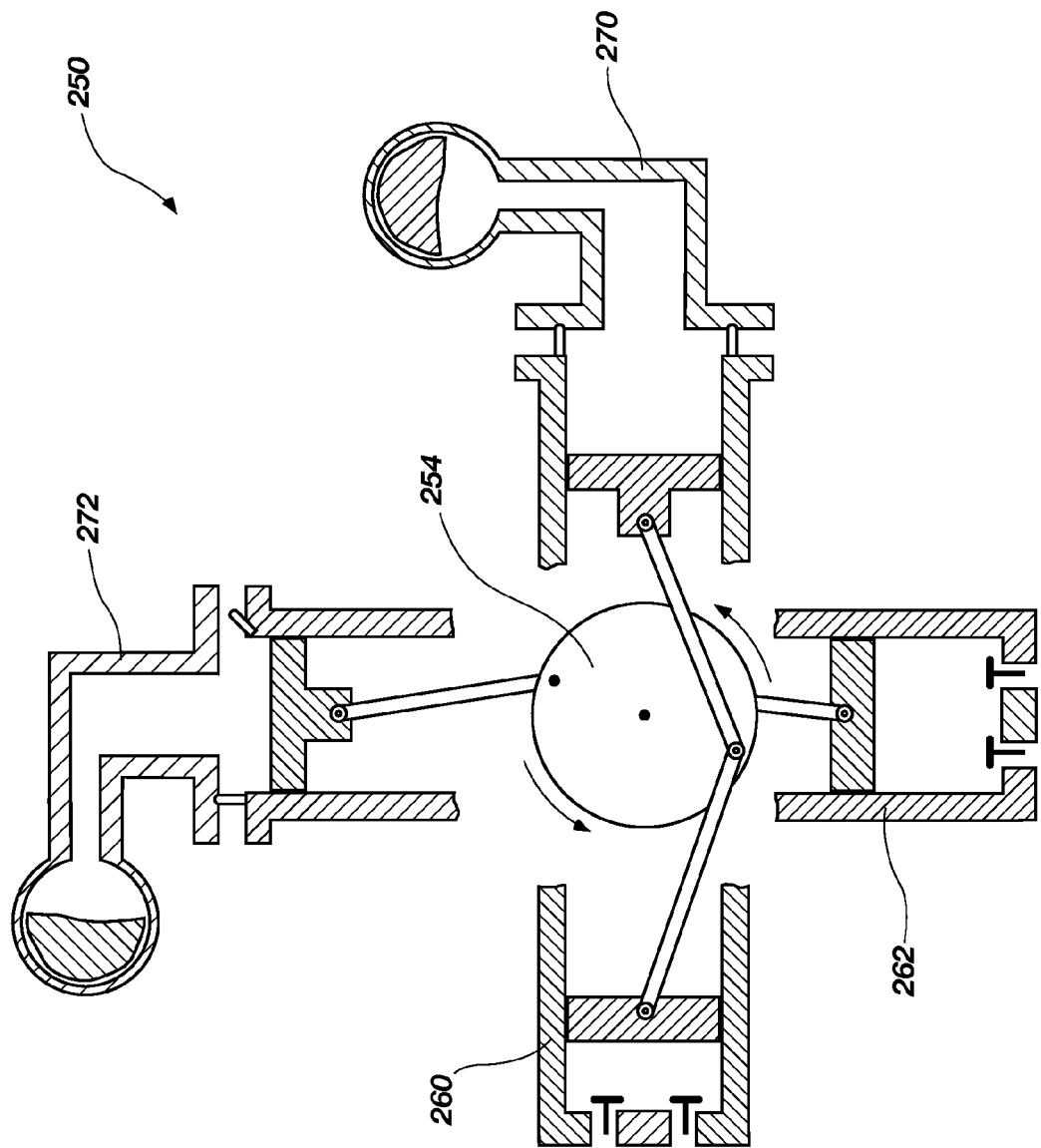
FIG. 8 illustrates a schematic top view of a disc pack configuration for a regenerative hydraulic pump system powered by an internal combustion engine, according to yet another exemplary embodiment of the present invention.

FIG. 8 illustrates a schematic top view of a disc pack configuration for a regenerative hydraulic pump system 250 powered by an internal combustion engine, according to yet exemplary embodiment of the present invention. In this embodiment multiple power cylinders and multiple regenerative pump cylinders can be arranged in a disc configuration to minimize the space requirements. The rotating inertia of the crankshaft 254 continues to transfer power back and forth between a power cylinder 260 and a regenerative hydraulic pump cylinder 270, and also between a second power cylinder 262 and a second regenerative pump cylinder 272. The advantage to this arrangement is that the size of the engine/pump apparatus can be sharply limited in one dimension, allowing it to be located near the hydraulic actuator in a robotic application. For example, in an energetically autonomous robot that is driven by actuators at each joint, multiple engine/pump disc packs can be mounted near each actuator and connected to that actuator's hydraulic system, to a fuel supply, and to a control system. And as the hydraulic requirement of each individual actuator is limited, the engine/pump disc pack can be made quite small and lightweight, ideal for robotic applications.

However, even though only two power cylinders and two regenerative pump cylinders are shown in FIG. 8, nothing should be read into the drawing to limit the number of power cylinders or regenerative pump cylinders that can be included in an individual I.C. engine/regenerative hydraulic pump system, or furthermore to limit the arrangement of system components to a planar disc. It should be understood by one having skill in the art that the internal combustion engine/regenerative hydraulic pump, as described in FIG. 1 and further expanded upon in FIG. 8, can form the basic building block of a modular I.C. engine/regenerative hydraulic pump system, where the crankshaft can be expanded and additional modules added to accommodate expanded hydraulic requirements.

Figure 9:
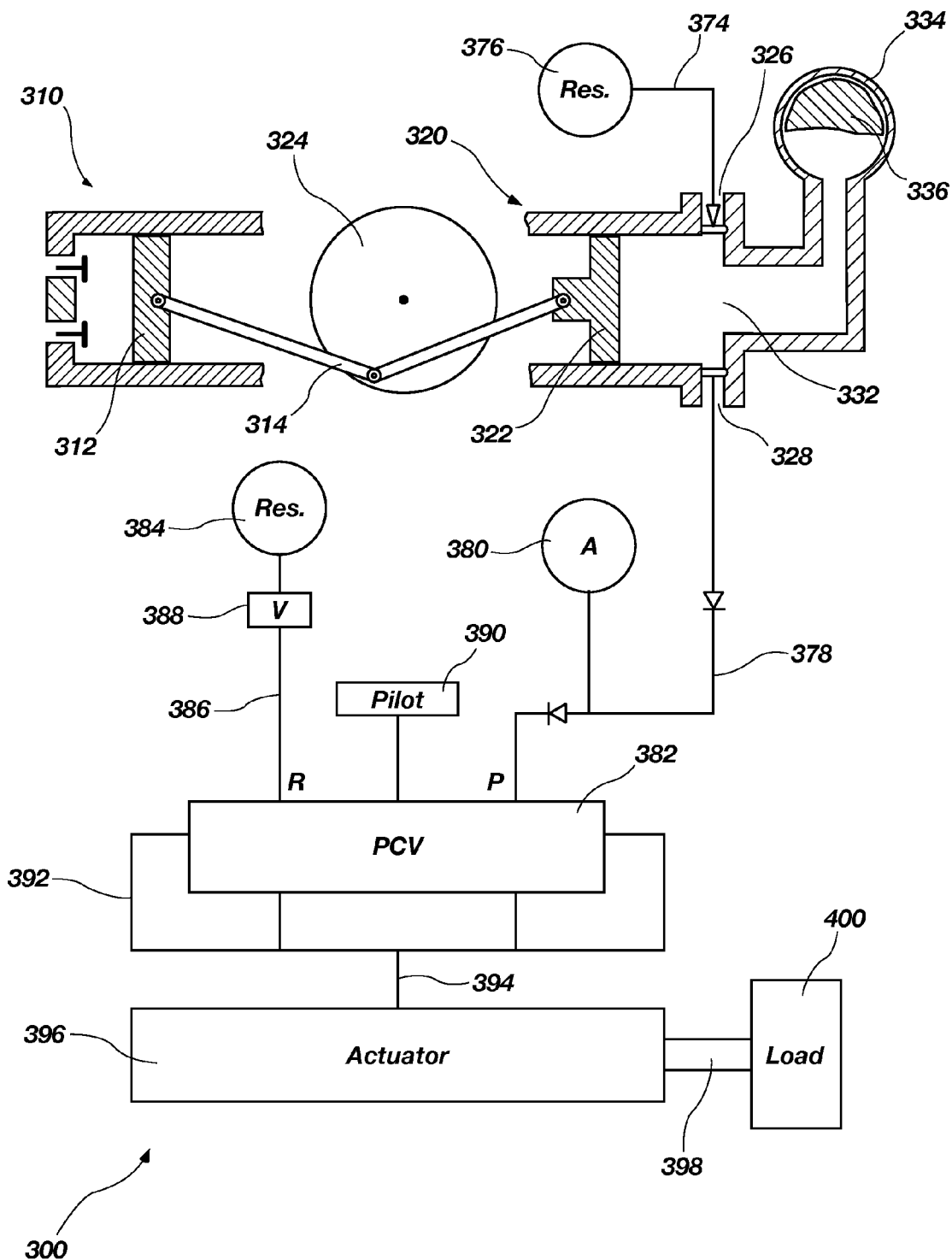
FIG. 9 illustrates a block diagram associated with various partial schematic side views, depicting the use of a regenerative hydraulic pump system to provide hydraulic fluid to a pressure control valve configured to regulate the pressure and flow of hydraulic fluid in and out of an actuator attached to a load.

With reference to FIG. 9, illustrated is a block diagram associated with various partial schematic side views, depicting the use of a single exemplary internal combustion engine/regenerative hydraulic pump system to provide hydraulic fluid to a pressure control valve, which is configured to regulate the pressure and flow of hydraulic fluid in and out of a single actuator attached to a load, which components may collectively be referred to herein as a powered actuator system 300. In this embodiment, the internal combustion engine 310 uses a power piston 312 and power rod 314 to drive crankshaft 324. The crankshaft, in turn, drives the regenerative hydraulic pump 320 to pump pressurized hydraulic fluid through line 378 into a pressure control valve 382.

As the pump piston 322 moves within the regenerative hydraulic pump, it receives hydraulic fluid from a hydraulic reservoir 376 through reservoir line 374. The hydraulic fluid is drawn into the compliant pressure chamber 332 through suction port 326 during the suction stroke. During the subsequent pumping stroke, the gas bladder 336 inside pneumatic accumulator 334 acts as a compliant member that compresses to absorb a portion of the energy extracted from the crankshaft during the pumping stroke, with the remainder of the energy being using to pump the hydraulic fluid out discharge port 328. The gas bladder expands back to its original size during the succeeding back stroke, thereby releasing its stored energy back to the pump piston and ultimately recycling the unused energy back to the crankshaft and internal combustion engine. Meanwhile, the high pressure hydraulic fluid moves forward through line 378 to charge hydraulic accumulator 380, which is configured to provide the pressure control valve 382 with hydraulic fluid under various select pressures.

The pressure control valve 382 comprises a pressure inlet fluidly coupled to pressure line 378 and a return inlet fluidly coupled to a reservoir 384 through return line 386, which return line is controlled by valve 388. Also fluidly coupled to the pressure control valve is a pilot valve 390 configured to provide a first stage pressure to the pressure control valve. Extending from the pressure control valve is a main line 392 that is in fluid communication with load pressure feedback ports formed in opposite sides of the pressure control valve, as well as pressure and return outlet ports also formed in the pressure control valve and that communicate with pressure and return inlet ports upon the selective positioning of first and second spools (not shown) strategically supported within the pressure control valve. The main line is in further fluid communication with a load feed line 394 that is in turn in fluid communication with a load 400 acting through load support 398 and actuator 396. The specific functionality of the hydraulic pump, the pressure control valve 382, and the actuator 396 are more specifically set forth in U.S. Pat. No. 7,308,848; and U.S. Pat. No. 7,284,471, each of which are incorporated by reference in their entirety herein.

In the configuration shown, the regenerative hydraulic pump allows the internal combustion engine to run continuously and efficiently at high speed, even between periods of pumping demand. Therefore, the full power and torque of the engine is available almost instantaneously, with the next stroke of the pump piston. Any 'ramping-up' response time delay associated with bringing the internal combustion engine/hydraulic pump system up to an operating speed capable of meeting pump demand is eliminated, because the system is already running at high speed.

The regenerative hydraulic pump cylinder of the present invention allows for this continuous mode of operation by not wasting energy when the hydraulic fluid is not needed by the downstream actuator 396 and pressure control valve 382. Instead of forcing more fluid into an already saturated high-pressure system, with regenerative pumping any energy extracted during the pumping stroke that is not used to pump fluid out the discharge port 328 is generally conserved and immediately fed back into the power system via the back stroke, allowing the engine to run at high speed with only the energy needed to overcome incidental losses. However, as soon as the pressure control valve draws down hydraulic accumulator 380 by directing hydraulic fluid to the actuator, the regenerative hydraulic pump immediately responds by providing additional hydraulic fluid at a pressure necessary for the pressure control valve to accurately and timely drive the actuator and ultimately the load 400. And because the regenerative hydraulic pump responds so quickly to any drop in pressure in the downstream hydraulic system, the size and weight of the hydraulic accumulator can be reduced.

The use of a regenerative hydraulic power system is also advantageous in that the actuator is capable of driving the load using large amounts of power received in short amounts of time and on demand. Therefore, there are few losses in the system between the internal combustion engine and the actual driving of the actuator and load, as well as an increase in output power. For example, without describing the specific functions of the pilot and pressure control valves, if the load 400 was to be continuously driven or held in place to overcome gravitational forces, the internal combustion engine could be continuously throttled forward to produce constant energy that may be converted into usable power by the regenerative hydraulic pump, and the pump would be continuously operated to supply the necessary pressurized hydraulic fluid needed to sustain the actuator in the drive mode. In another example, if the actuator 396 was to be actuated and the load 400 driven periodically (either randomly or in systematic bursts), the internal combustion engine is still operated continuously at high speeds, but throttled back to conserve energy during idle periods and throttled forward to produce rapid bursts of energy when the actuator is in operation.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not expressly recited, except in the specification. Accordingly, the scope of the invention should be determined solely by the appended claims and their legal equivalents, rather than by the descriptions and examples given above.

What is claimed and desired to be secured by Letters Patent is:

1. A regenerative hydraulic pump for efficient operation under high pressure/low flow conditions comprising:
a crankshaft to provide a rotating inertial mass;
at least one regenerative hydraulic pump cylinder operable with the crankshaft, comprising:
a pump cylinder housing;
a pump piston moveable within the pump cylinder housing and mechanically connected to the crankshaft; and
a compliant pressure chamber configured to receive fluid displaced by the pump piston; and
a compliant member operable with the compliant pressure chamber to store a portion of the energy extracted by the pump piston during a pumping stroke, the portion being stored as potential energy for release back to the pump piston and to the crankshaft during a selective regenerative back stroke, wherein at least a portion of the potential energy stored by the compliant member is capable of being selectively isolated from the pump piston, and wherein the compliant member is maintained by a bias having a same preset bias characteristic.

2. The regenerative hydraulic pump according to claim 1, wherein the preset bias characteristic is non-linear.

3. The regenerative hydraulic pump according to claim 1, wherein the compliant member is located outside the pump cylinder housing.

4. The regenerative hydraulic pump according to claim 3, wherein the compliant member further comprises a first pneumatic accumulator in fluid communication with an inside portion of the pump cylinder housing through a hydraulic fluid channel, and wherein the hydraulic fluid channel allows for bi-directional flow between the inside portion of the pump cylinder housing and the first pneumatic accumulator.

5. The regenerative hydraulic pump according to claim 4, wherein the compliant member further comprises at least one second pneumatic accumulator in fluid communication with the inside portion of the pump cylinder housing through a hydraulic fluid channel, and wherein the hydraulic fluid channel allows for bi-directional flow between the inside portion of the pump cylinder housing and the second pneumatic accumulator.

6. The regenerative hydraulic pump according to claim 5, wherein the second pneumatic accumulator has a different volume than the first pneumatic accumulator, and wherein the second pneumatic accumulator has a different charging pressure than the first pneumatic accumulator.

7. The regenerative hydraulic pump according to claim 5, wherein the hydraulic fluid channel to the first pneumatic accumulator and the hydraulic fluid channel to the second pneumatic accumulator are switchably controlled between an open position and a closed position to create a non-linear reaction to the pumping stroke of the pump piston.

8. A regenerative hydraulic pump system for efficient operation under high pressure/low flow conditions comprising:
an internal combustion engine comprising:
a crankshaft providing a rotating inertial mass;
at least one power cylinder; and
a power piston mechanically connected the crankshaft; and
a regenerative hydraulic pump comprising:
at least one pump cylinder;
a pump piston mechanically connected to the crankshaft, wherein the crankshaft transfers power between the power cylinder and the regenerative hydraulic pump cylinder; and
a compliant pressure chamber configured to receive fluid displaced by the pump piston; and
a compliant member operable with the compliant pressure chamber to store a portion of the energy extracted by the pump piston during a pumping stroke, the portion of energy being stored as potential energy for release back to the pump piston and to the crankshaft during a selective regenerative back stroke, wherein at least a portion of the potential energy stored by the compliant member is capable of being selectively isolated from the pump piston, and wherein the compliant member is maintained by a bias having a same preset bias characteristic.

9. The regenerative hydraulic pump system according to claim 8, wherein the preset bias characteristic is non-linear.

10. The regenerative hydraulic pump system according to claim 8, wherein the compliant member is located outside the pump cylinder housing.

11. The regenerative hydraulic pump system according to claim 10, wherein the compliant member further comprises a first pneumatic accumulator in fluid communication with an inside portion of the pump cylinder housing through a hydraulic fluid channel, and wherein the hydraulic fluid channel allows for bi-directional flow between the inside portion of the pump cylinder housing and the first pneumatic accumulator.

12. The regenerative hydraulic pump system according to claim 11, wherein the compliant member further comprises at least one second pneumatic accumulator in fluid communication with the inside portion of the pump cylinder housing through a hydraulic fluid channel, and wherein the hydraulic fluid channel allows for bidirectional flow between the inside portion of the pump cylinder housing and the second pneumatic accumulator.

13. The regenerative hydraulic pump system according to claim 12, wherein the second pneumatic accumulator has a different volume than the first pneumatic accumulator, and wherein the second pneumatic accumulator has a different charging pressure than the first pneumatic accumulator.

14. The regenerative hydraulic pump system according to claim 12, wherein the hydraulic fluid channel to the first pneumatic accumulator and the hydraulic fluid channel to the second pneumatic accumulator are switchably controlled between an open position and a closed position to create a non-linear reaction to the pumping stroke of the pump piston.

15. A method for operating a regenerative hydraulic pump under high pressure/low flow conditions, comprising the steps of:
   connecting a pump piston of at least one regenerative hydraulic pump to a crankshaft, each regenerative hydraulic pump having a pump cylinder and a compliant pressure chamber having a compliant member, wherein the crankshaft is mechanically connected to a drive system;
   connecting the compliant pressure chamber to a source of low-pressure hydraulic fluid through a suction valve;
   connecting the compliant pressure chamber to a pressurized receiver of high-pressure hydraulic fluid through a discharge valve;
   causing the pump piston to draw a volume of hydraulic fluid into the compliant pressure chamber through the suction valve;
   causing the pump piston to pressurize the hydraulic fluid against the compliant member to store a portion of the energy of the pumping stroke as potential energy within the compliant member, until the hydraulic fluid reaches a threshold pressure sufficient to cause the hydraulic fluid to flow into the pressurized receiver through the discharge valve;
   isolating at least a portion of the potential energy stored by the compliant member from the pump piston; and
   causing the pump piston to perform a regenerative back-stroke wherein the compliant member selectively releases the stored potential energy back to the pump piston in order to the drive system connected to the crankshaft, and wherein the compliant member is maintained by a bias having a same preset bias characteristic.

16. The method of claim 15, wherein the compliant member is selected from the group consisting of a spring piston and a pneumatic accumulator.

17. A regenerative hydraulic pump for efficient operation under high pressure/low flow conditions comprising:
   a crankshaft to provide a rotating inertial mass;
   at least one regenerative hydraulic pump cylinder operable with the crankshaft, comprising:
      a pump cylinder housing;
      a pump piston moveable within the pump cylinder housing and mechanically connected to the crankshaft; and
      a compliant pressure chamber configured to receive fluid displaced by the pump piston; and
   a compliant member operable with the compliant pressure chamber to store a portion of the energy extracted by the pump piston during a pumping stroke, the portion being stored as potential energy for release back to the pump piston and to the crankshaft during a selective regenerative back stroke, wherein the potential energy stored by the compliant member is capable of being selectively isolated from the pump piston, and wherein the compliant member is maintained by a bias having a preset bias characteristic.

* * * * *